United States Patent
Ehlhardt et al.

(10) Patent No.: US 6,571,689 B2
(45) Date of Patent: Jun. 3, 2003

(54) APPARATUS FOR DEEP-FRYING FOOD COMPRISING A RESERVOIR FOR COLLECTING VAPOR BEING DISCHARGED DURING THE DEEP-FRYING PROCESS

(75) Inventors: Huub Ehlhardt, Groningen (NL); Mindert Kats, Drachten (NL); Klaas Kooyker, Drachten (NL); Bart Johannes Massee, Groningen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/201,675

(22) Filed: Jul. 23, 2002

(65) Prior Publication Data

US 2003/0019366 A1 Jan. 30, 2003

(30) Foreign Application Priority Data

Jul. 26, 2001 (EP) ............................................. 01202853

(51) Int. Cl.[7] ............................ A47J 36/38; A47J 37/12
(52) U.S. Cl. ............................... 99/403; 99/330; 99/410
(58) Field of Search .......................... 99/325–333, 341, 99/403–418, 467, 473; 126/299 D, 381.1; 55/309.1, DIG. 36; 210/167, DIG. 8; 219/401

(56) References Cited

U.S. PATENT DOCUMENTS 5,584,234 A * 12/1996 Baillieul et al. .............. 99/403
5,996,474 A * 12/1999 Collas et al. ................. 99/403
5,996,477 A * 12/1999 Bois et al. .................... 99/403
6,047,632 A * 4/2000 Bouffay et al. .............. 99/403

FOREIGN PATENT DOCUMENTS

| EP | 0693893 B1 | 1/1996 | ........... A47J/36/38 |
| FR | 2303448 | 10/1976 | |
| GB | 443785 | 3/1936 | |

* cited by examiner

Primary Examiner—Timothy F. Simone
(74) Attorney, Agent, or Firm—Frank Kefgan

(57) ABSTRACT

An apparatus for deep-frying food, comprising a vapour discharge channel (6) communicating with an inner space (3) and extending from an upper portion of said inner space. A cooling surface (7), which is cooled in use, is provided for cooling vapours. Condensate that has deposited precipitated on the cooling surface (7) can be collected in a collecting reservoir (13), into which the vapour discharge channel (6) opens. Fat contained in vapour being discharged deposits in a fat deposition area (14) outside the cooling surface (7). Since at least a portion of the fat deposition area (14) communicates with the collecting reservoir (13) for carrying fat that has deposited in the fat deposition area to the collecting reservoir along a path remote from the cooling surface (7), and/or since the vapour discharge channel (6) extends along a straight trajectory, the deposition of fat is made to occur in an area from which it can easily be removed.

11 Claims, 3 Drawing Sheets

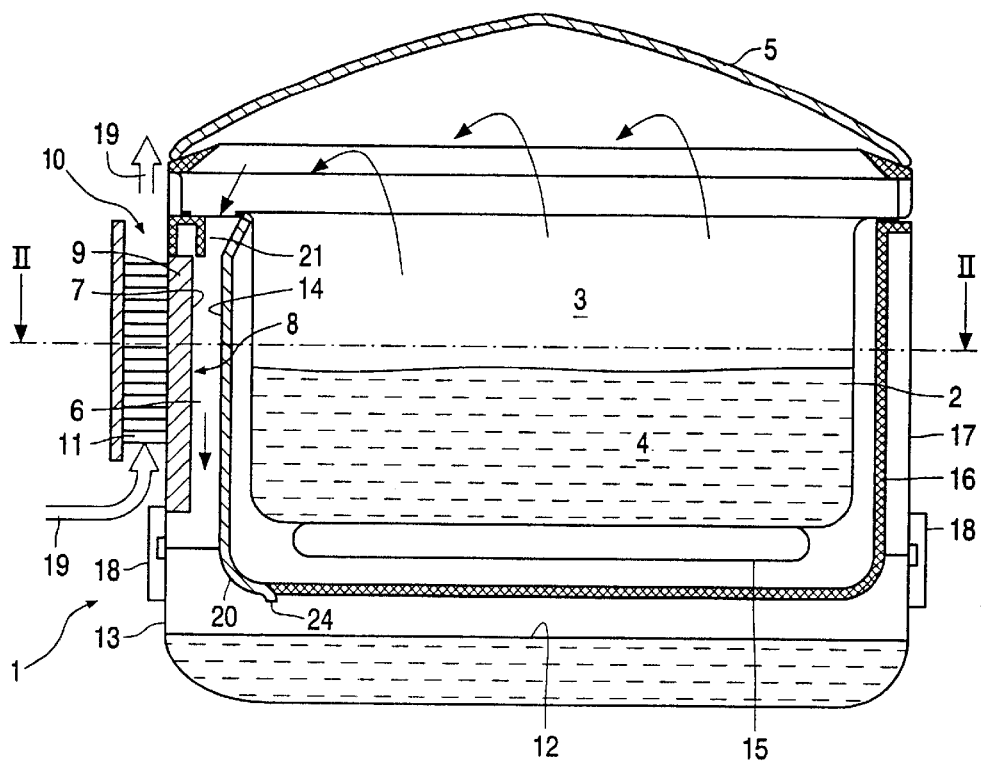
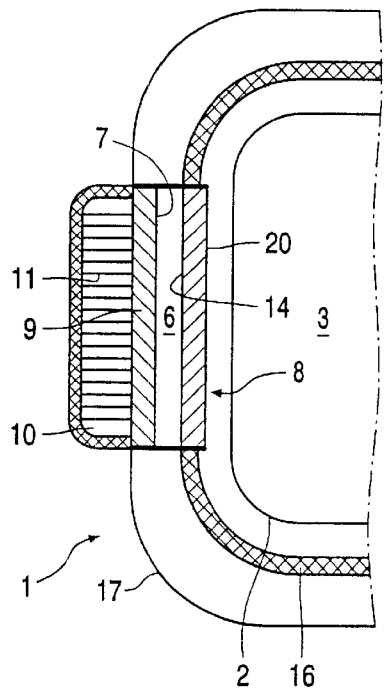
FIG. 1
FIG. 2

APPARATUS FOR DEEP-FRYING FOOD COMPRISING A RESERVOIR FOR COLLECTING VAPOR BEING DISCHARGED DURING THE DEEP-FRYING PROCESS

The invention relates to an apparatus for deep-frying food, comprising:
- a pan for containing a frying medium which is liquid in use,
- a cover, in which the pan and the cover when placed on the pan define an inner space,
- a vapour discharge channel communicating with said inner space and extending from an upper portion of said inner space,
- a cooling surface for cooling vapours, which cooling surface communicates with said inner space via at least a portion of said vapour discharge channel,
- a collecting reservoir for storing condensate that has precipitated on said cooling surface, into which collecting reservoir the vapour discharge channel opens, and
- a fat deposition area outside the cooling surface.

Such an apparatus is known from European patent no. 0 693 893. In such an apparatus, hot vapour released during the deep-frying process is carried via the vapour discharge channel to a cooling surface, where the vapour condenses. The condensate then drips from the cooling surface into the collecting reservoir. This leads to a reduction of the emission of smells during the deep-frying process.

A disadvantage of this apparatus is the fact that fat and oil constituents being carried along in the form of drops and/or vapour in the vapour discharged via the vapour discharge channel (hereinafter called "fat constituents" or "fat") deposit in the vapour discharge channel, more particularly on the cooling surface thereof, which is cooled by means of ice in this deep-frying pan. This fouling of the cooling surface has an adverse effect on the effectiveness of the cooling surface. In addition to this, the fouling of the vapour discharge channel in its entirety is unhygienic and removing the fouling is a laborious activity.

It is an object of the invention to provide a solution which reduces the extent of fouling of the cooling surface and simplifies the removal of at least a significant portion of the fat discharged via the vapour discharge channel.

In the case where the fat deposition area forms a boundary of the vapour discharge channel, this object is achieved according to the present invention by an apparatus which is characterized in that at least a portion of the fat deposition area communicates with the collecting reservoir for carrying fat that has deposited in the fat deposition area to the collecting reservoir along a path remote from the cooling surface.

In a deep-frying apparatus according to the invention, the fat being discharged via the vapour discharge channel is carried to the collecting reservoir, at least to a significant extent, and collected there. From the collecting reservoir, the fat can easily be removed. This manner of at least assisting in the transport of fat to the collecting reservoir is possible because fat that has deposited in the fat deposition area is carried to the collecting reservoir along a path remote from the cooling surface, as in the apparatus as claimed in claim 1.

The above object may also be achieved in that a large portion of the vapour discharged by the vapour discharge channel reaches the collecting reservoir straight through the vapor discharge channel without fat constituents carried along depositing in the vapour discharge channel, as in the apparatus as claimed in claim 11.

A highly effective transport of fat constituents to the collecting reservoir is achieved by providing an apparatus as claimed in claims 1 and 11, in which fat constituents in the discharged vapour are carried to the collecting reservoir both directly and indirectly while being kept remote from the cooling surface.

Particularly advantageous embodiments of the invention are defined in the dependent claims.

Further aspects, effects and details of the invention will be described hereinafter by means of examples of embodiment illustrated in the drawings, in which FIG. 1 is a sectional side elevation of an apparatus according to a first example of embodiment of the invention;

FIG. 2 is a sectional view along the line II—II in FIG. 1;

Figure 3:
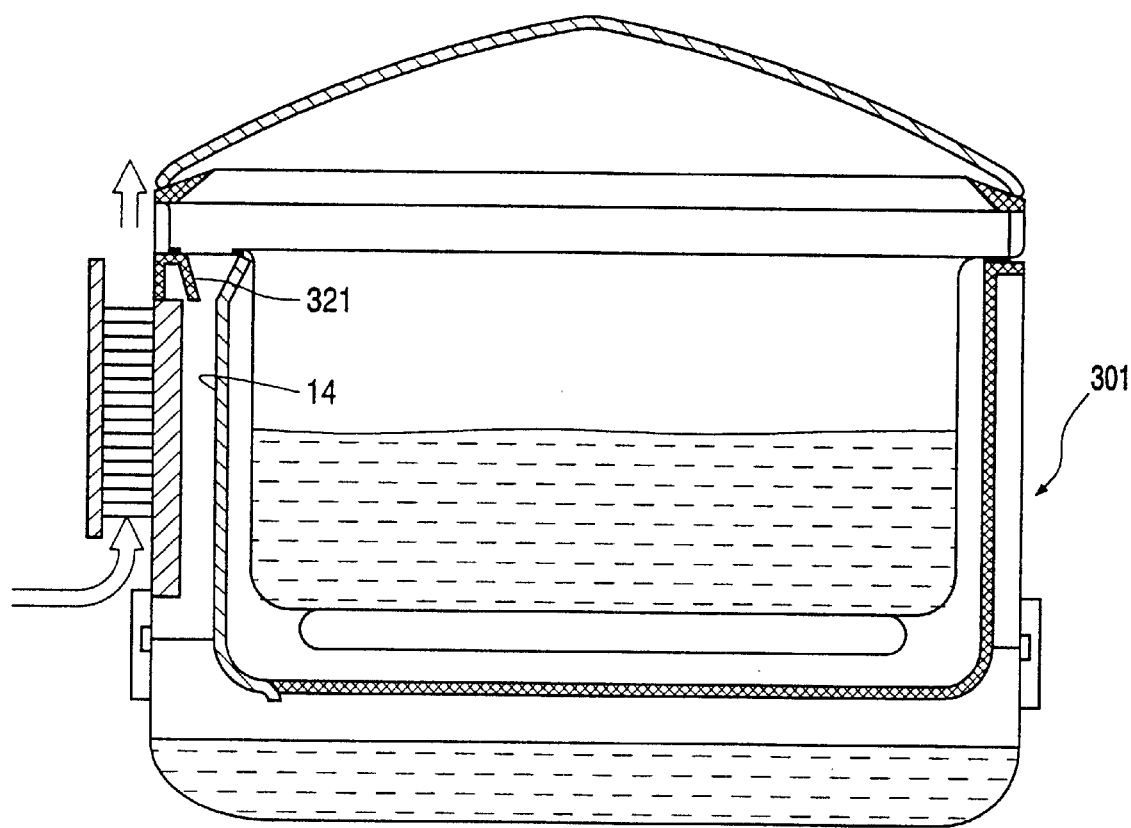
FIG. 3 is a sectional side view of an apparatus according to a second example of embodiment of the invention.

The apparatus for deep-frying food according to the example of embodiment shown in FIGS. 1 and 2 is arranged as a table-top model deep-frying pan 1. Also other embodiments of the deep-frying apparatus are possible, the deep-frying apparatus can for example be designed as a unit which is (to be) built into a kitchen cabinet.

The deep-frying pan 1 comprises an inner pan 2 including an inner space 3 for containing a frying medium 4 which is liquid in use, such as frying fat or frying oil. Another part of the deep-frying pan 1 is a deep-frying basket (not shown), which can be suspended in the inner pan 2. Such baskets are generally known from practice.

A cover 5, when placed on the inner pan 2, forms an upper boundary of the inner space 3 of the inner pan 2. A vapour discharge channel 6 extends from said inner space 3, which vapour discharge channel 6 communicates with the inner space 3.

A cooling surface 7 made up of a surface of a heat exchanger 8 is provided to cool vapours. The heat exchanger 8 includes a plate 9 of aluminium or another heat conducting material on the side of the vapour discharge channel. The plate 9 may be flat or have a profile which is preferably oriented vertically or at least transversely to contour lines of the plate so as to aid the drainage of fat. On the side facing away from the vapour discharge channel 6, the heat exchanger 8 includes an air duct 10, in which heat exchanging lamellae 11 extend. In use, ambient air flows through the air duct 10 as a cooling medium for cooling the cooling surface. Said air is heated through heat exchange with the lamnellae 11 and the plate 9. The air flow in the air duct 10 is preferably produced by a fan (not shown). It is also possible to effect an air flow through the duct 10 solely by convection, but the cooling effect will then generally be less strong, at least if comparable dimensions of the duct 10 are used. The cooling surface 7 communicates with the inner space 3 via part of the vapour discharge channel 6, so that vapour being discharged from the inner space 3 during deep-frying can reach the cooling surface 7 and condense thereon.

A collecting reservoir 13, into which the vapour discharge channel 6 opens, is provided for collecting the condensate 12 that has deposited on the cooling surface 7.

A portion 14 of the inner surface of the vapour discharge channel 6 on the side of the inner pan 2 forms a fat deposition area outside the cooling surface 7, which fat deposition area 14 forms a boundary of the vapour discharge channel 6.

The pan comprises a heating element 15 for heating the frying fat or frying oil. In this example of embodiment, the fat deposition area 14 and the heat exchanger 8 are present in a double-walled housing having a thermally insulating inner wall 16 and an outer wall 17. The collecting reservoir 13, which is connected to the outer wall 17 by means of detachable fastenings 18, also forms a bottom portion of the housing. In order to make it easier to empty and clean the reservoir, for which activities the pan containing the fat need not be lifted, the collecting reservoir can be designed as a receptacle of a drawer which can be pulled out of the housing.

The fat deposition area 14 communicates with the collecting reservoir 13 for carrying fat that has deposited in the fat deposition area 14 to the collecting reservoir 13 along a path remote from the cooling surface 7.

In use, food is deep-fried in the inner space 3 in the deep-frying medium 4 that is heated by the heating element. During this process, substantial amounts of water vapour are released, which leave the inner space 3 via the vapour discharge channel 6. A portion of the water vapour condenses on the cooling surface 7 and drips into the collecting reservoir. Another portion of the water vapour being discharged condenses in the collecting reservoir 13. Basically, it is not necessary to discharge vapour into the environment, but some discharge may take place if complete condensation of the water vapour being released is not effected.

The cooling surface 7 heats up as a result of heat exchange with passing vapour and the condensation of vapour thereon. Also cooling of the cooling surface takes place, however, on account of the fact that heat is given off, via the plate 9, to the lamellae 11, which in turn give off the heat to the air flow 19 passing through the air duct 10. Also other ways of cooling the surface are possible, however, for example through heat exchange with a pre-cooled medium having a large thermal capacity, such as ice.

Fat particles are carried along with the water vapour. Said fat particles largely deposit in the fat deposition area 14. From the fat deposition area 14, deposited fat runs down to the collecting reservoir 13, from which it can easily be removed by cleaning the collecting reservoir 13, for example in a dishwashing machine. The drainage of the deposited fat to the collecting reservoir is aided by the deposition area 14 not being cooled and the deposited frying fat constituents therefore remaining sufficiently liquid, at least to a significant extent, to run down over the fat deposition area 14 under the influence of gravity.

Carrying fat constituents in the discharged vapour to the collecting reservoir 13 is furthermore aided by the fact that the vapour discharge channel 6 extends along a straight path from the inner space 3 of the pan 2 to the collecting reservoir 13, at least in the sense that a straight line may be drawn from the inlet to the outlet, which line does not touch the walls of the channel 6 (it is possible to see the outlet when looking through the inlet of the vapour discharge channel 6, and vice versa). A relatively large portion of the fat constituents thus remains remote from the cooling surface and from the fat deposition area 14 when they pass through the vapour discharge channel 6 to the collecting reservoir 13, where the fat constituents mainly deposit on the water 12 in the collecting reservoir 13. Just like the fat constituents that have reached the collecting reservoir 13 via the fat deposition area 14, the fat constituents that have been carried directly to the collecting reservoir 13 can easily be removed from the collecting reservoir 13.

The fat deposition area 14 extends over substantially the entire length of the vapour discharge channel 6. This makes it possible to carry fat that has deposited over substantially the entire length of the vapour discharge channel 6 to the collecting reservoir 13 past the fat deposition area 14, with relatively little fat remaining in the vapour discharge channel 6.

In the apparatus according to this example of embodiment, the flowing of fat that has deposited in the fat deposition area 14 to the collecting reservoir in use is aided in that the vapour discharge channel 6 comprises a boundary surface which slopes down continuously in downstream direction from the fat deposition area 14 to the collecting reservoir 13. In order to help fat become detached at the end of the fat deposition area 14, said fat deposition area 14 comprises a free, downwardly extending end 24.

The fat deposition area 14 is preferably heated in use, also in the absence of a hot vapour flow in the channel, to assist in the drainage of deposited fat. The temperature of the fat deposition area 14 in the absence of a heating vapour flow preferably reaches a value which is not very high, because a very high temperature acts to boost oxidation of the fat, which process precisely counteracts said drainage. The balance temperature which the fat deposition area reaches in use, albeit in the absence of a vapour flow, is preferably higher than the congealing point of common frying fats, for example more than 37–45° C. and preferably less than 65–90° C., more particularly 75–80° C.

In the apparatus according to this example of embodiment, the cooling surface 7 also forms a boundary of the vapour discharge channel 6 upstream of the collecting reservoir 13. The advantage of this arrangement is that it is possible for a compact configuration to realise an intensive heat exchange with the discharged vapour. In order to then prevent fat from depositing on the cooling surface 7, the apparatus according to this example of embodiment is provided with a deflector 21 in the vapour discharge channel 6 upstream of the cooling surface 7, for deflecting the vapour flow from the cooling surface.

The cooling surface 7 is receded relative to the deflector 21 in a direction away from the fat deposition area 14. Thus, the vapour flow mainly moves past the fat deposition area 14, especially in the upstream portion of the vapour discharge channel 6, so that fat constituents in the vapour flow will mainly deposit in the fat deposition area 14. Thus, fat constituents have already been removed to a significant extent from vapour that reaches the relatively cool cooling surface 7.

FIG. 3 shows a deep-frying pan 301 which is identical with the deep-frying pan shown in FIGS. 1 and 2, with the exception of the arrangement of the deflector 321. The deep-frying pan according to this example of embodiment is the embodiment that is most strongly preferred at this moment.

The deflector 321 is configured to describe a line which extends in downstream direction towards the fat deposition area 14, so as to direct passing vapour to the fat deposition area 14. Since at least a downstream surface portion of the deflector 321 is thus configured to describe a line extending in the direction of flow to the fat deposition area 14, the vapour flow is directed at the fat deposition area 14 at an angle thereto and brought into intensive contact with the fat deposition area 14. This arrangement is highly conducive to the deposition of fat constituents in the fat deposition area, while it further prevents fat from depositing on the cooling surface 7.

Figure 4:
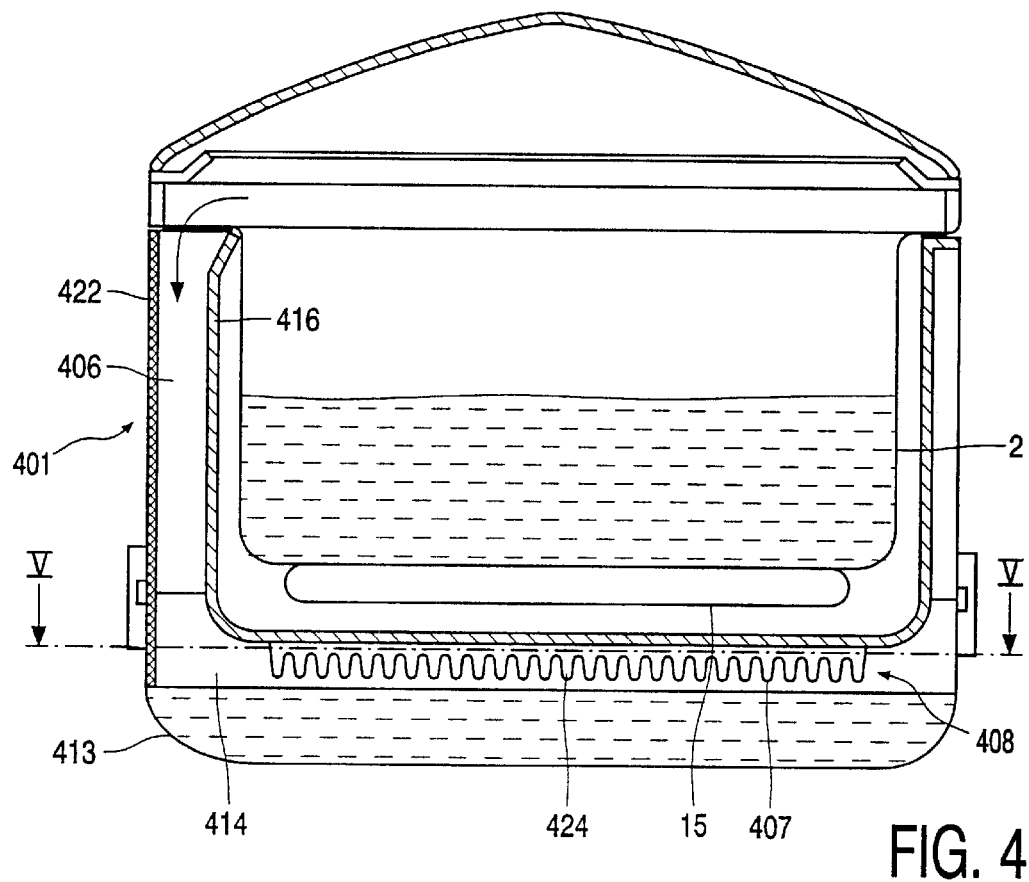
FIG. 4 is a sectional side elevation of an apparatus according to a third example of embodiment of the invention.
Figure 5:
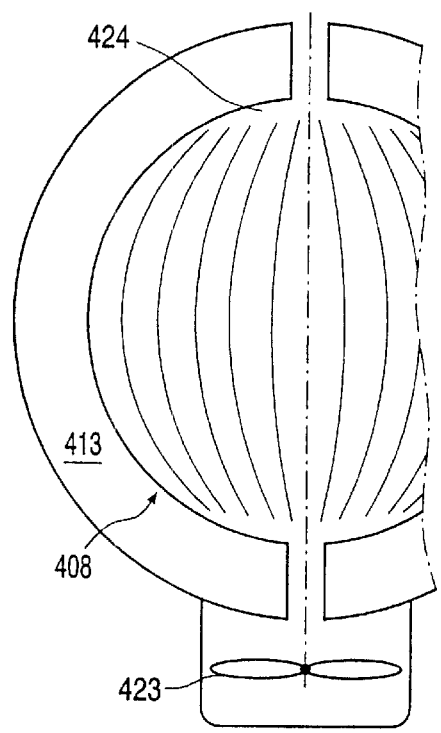
FIG. 5 is a sectional view along the line V—V in FIG. 4.

FIGS. 4 and 5 show a deep-frying pan 401 according to a third example of embodiment of the invention. The vapour discharge channel 406 of this deep-frying pan likewise extends along a straight path, so that a large portion of the fat constituents in the water vapour being discharged reaches the collecting reservoir 43 without depositing on the wall of the vapour discharge channel 406. The collecting reservoir thus forms part of the fat deposition area 414 in this pan as well.

The outer wall 422 of the vapour discharge channel 406 is made of a thermally insulating material, and the inner wall 416 of the double-walled housing is made of a thermally conductive material, such as aluminium, which enables said inner wall to reach a relatively high temperature through the heat transfer from the inner pan 2 and the heating element 15. The cooling surface 407 is disposed within the collecting reservoir 413. Fat constituents in the vapour discharged have largely deposited in the vapour discharge channel 6 and in the collecting reservoir 413 before the vapour reaches the cooling surface 407 in this position.

The deposition of fat on the cooling surface 407 is further reduced in that the cooling surface 407 in the collecting reservoir 413 is located outside an area which is in line with the vapour discharge channel 406, in which area the deposition of fat constituents mainly takes place in the collecting reservoir 413.

A heat exchanger 408 comprising an air duct 424 through which a forced ambient air flow driven by a fan 423 passes, is provided for cooling the cooling surface 407.

We claim:

1. An apparatus for deep-frying food, comprising
   a pan (2) for containing a frying medium which is liquid in use,
   a cover (5), in which the pan (2) and the cover (5) when placed on the pan define an inner space (3),
   a vapour discharge channel (6; 406) communicating with said inner space (3) and extending from an upper portion of said inner space (3),
   a cooling surface (7; 407) for cooling vapours, which cooling surface (7; 407) communicates with said inner space (3) via at least a portion of said vapour discharge channel (6; 406),
   a collecting reservoir (13; 413) for receiving condensate that has precipitated on said cooling surface (7; 407), into which collecting reservoir (13; 413) the vapour discharge channel (6; 406) opens, and
   a fat deposition area (14; 414) outside the cooling surface (7; 407), which fat deposition area (14; 414) forms a boundary of the vapour discharge channel (6; 406),
   characterized in that at least a portion of the fat deposition area (14; 414) communicates with the collecting reservoir (13; 413) for carrying fat that has deposited in the fat deposition area (4; 414) to the collecting reservoir (13; 413) along a path remote from the cooling surface (7; 407).

2. An apparatus as claimed in claim 1, in which the fat deposition area (14; 414) extends over substantially the entire length of the vapour discharge channel (6; 406).

3. An apparatus as claimed in claim 1, in which at least a portion of the fat deposition area (14; 414) is arranged for heating said area in a manner other than by hot vapour in the vapour discharge channel (6; 406).

4. An apparatus as claimed in claim 3, in which the fat deposition area (14; 414) is located on a side of the vapour discharge channel (6; 406) facing the pan (2).

5. An apparatus as claimed in claim 1, in which at least a portion of the cooling surface (7) forms a boundary of the vapour discharge channel (6) upstream of the collecting reservoir (13), said apparatus further comprising a deflector (21; 321) disposed in the vapour discharge channel (6) upstream of the cooling surface (7) which deflects the vapour flow from the cooling surface (7).

6. An apparatus as claimed in claim 5, in which the cooling surface (7) is receded relative to the deflector (21, 321) in a direction away from the fat deposition area (14).

7. An apparatus as claimed in claim 5, in which at least a downstream portion of the deflector (321) is configured to describe a line which extends in downstream direction towards the fat deposition area (14) so as to direct vapour that flows past to the fat deposition area (14).

8. An apparatus as claimed in claim 1, in which at least a portion of the cooling surface (407) is located in the collecting reservoir (413).

9. An apparatus as claimed in claim 8, in which the cooling surface (407) in the collecting reservoir (413) is located outside an area which is in line with the vapour discharge channel (406).

10. An apparatus as claimed in claim 1, in which the vapour discharge channel (6; 406) comprises a boundary surface which slopes down continuously in downstream direction from the fat deposition area (14; 414) to the collecting reservoir (13; 413) for carrying deposited fat past said surface to the collecting reservoir (13; 413).

11. An apparatus for deep-frying food, comprising
    a pan (2) for containing a frying medium which is liquid in use,
    a cover (5), in which the pan (2) and the cover (5) when placed on the pan define an inner space (3),
    a vapour discharge channel (6; 406) communicating with said inner space (3) and extending from an upper portion of said inner space (3),
    a cooling surface (7; 407) for cooling vapours, which cooling surface (7; 407) communicates with said inner space (3) via at least a portion of said vapour discharge channel (6; 406),
    a collecting reservoir (13; 413) for receiving condensate that has precipitated on said cooling surface (7; 407), into which collecting reservoir (13; 413) the vapour discharge channel (6; 406) opens, and
    a fat deposition area (14; 414) outside the cooling surface (7; 407), characterized in that the vapour discharge channel (6; 406) extends along a straight trajectory from said inner space (3) to the collecting reservoir (13; 413).

* * * * *